United States Patent [19]

Lechner et al.

[11] Patent Number: 4,720,845
[45] Date of Patent: Jan. 19, 1988

[54] PROTECTIVE CIRCUIT FOR THE OVERVOLTAGE PROTECTION OF A SUBSCRIBER LINE INTERCONNECT CIRCUIT

[75] Inventors: Robert Lechner, Otterfing; Hans-Werner Rudolf; Roland Krimmer, both of Munich, all of Fed. Rep. of Germany

[73] Assignee: Siemens Aktiengesellschaft, Berlin & Munich, Fed. Rep. of Germany

[21] Appl. No.: 20,636

[22] Filed: Mar. 2, 1987

[30] Foreign Application Priority Data

Apr. 23, 1986 [DE] Fed. Rep. of Germany ....... 3613720

[51] Int. Cl.⁴ .......................... H04M 7/00; H02H 3/20
[52] U.S. Cl. ...................... 379/27; 379/412; 361/91; 361/119
[58] Field of Search ............ 379/27, 22, 26, 29, 379/412; 370/14, 16; 361/91, 119, 120

[56] References Cited

U.S. PATENT DOCUMENTS 4,254,442 3/1981 Dijkmans et al. .............. 361/119 X
4,661,979 4/1987 Jakab .................................... 379/412

Primary Examiner—Stafford D. Schreyer
Attorney, Agent, or Firm—Jeffrey P. Morris

[57] ABSTRACT

The invention describes a protective circuit for the protection of the electronic interconnect circuit (SLIC) and the electronic switches for test access, by means of a threshold setting element which is provided for each conductor (a,b) of a core pair for the shunting of overvoltages to ground, as well as a current path of higher breakover voltage for each conductor of the core pair, which permits checking the subscriber line circuit for line interruption during a malfunction of the threshold setting element.

5 Claims, 3 Drawing Figures

PROTECTIVE CIRCUIT FOR THE OVERVOLTAGE PROTECTION OF A SUBSCRIBER LINE INTERCONNECT CIRCUIT

CROSS REFERENCE TO RELATED APPLICATIONS

1. Robert Lechner et al. case U.S. Ser. No. 020,809 Protective Circuit For The Overvoltage Protection of a Subscriber Line Interconnect Circuit; filed on Mar. 2, 1987 and assigned to the same assignee as the present application.

2. Peter Vaclavik, case U.S. Ser. No. 020,814 and assigned to the same assignee as the present application. Circuit Arrangement For The Connection of Line Circuits of a Digital Time Multiplex Telephone Network; filed on even date herewith.

BACKGROUND OF THE INVENTION

1. Field of the Invention

The invention relates to a protective circuit for the overvoltage protection of a telephone subscriber line interconnect circuit of a digital time multiplex-communication network which includes an electronic interface circuit; and for the overvoltage protection of the electronic switches associated with the subscriber line circuit for test accessibility. Each conductor of a core pair of the connected subscriber line circuit for each corresponding connection of the subscriber line interconnect circuit has provided an isolation of the separate conductors of the core pair from the connected subscriber line circuit, and a separate test access connection to the conductors of the core pair and to the corresponding connections of the active subscriber line interconnect circuits.

2. Description of the Prior Art

The necessity for a protective circuit is that the the interface circuit of the subscriber line interconnect circuit includes electronic circuit elements, as does the test accessibility circuits. Prior art subscriber line interconnect circuits, in which the interface circuit include repeating coils and voltage stabilizing resistors, and in which test accessibility is by means of electromagnetic relays, can withstand overvoltages in the order of 1 kV without damage, so that a protective circuit is not required.

A protective circuit in accordance with the present invention must meet the requirement that the resistance symmetry imposed upon the cable conductors must remain unaffected. Furthermore, in the event of a current interruption in the subscriber line interconnect circuit resulting from a malfunction, it must be acertained whether this interruption is a result of the subscriber line interconnect circuit itself, or of a defect in the protective circuit.

SUMMARY OF THE INVENTION

A protective circuit is described in which a threshold value element is provided for a line conductor connected on the line side of the electronic circuit for test accessibility to the subscriber interface line, which is of identical configuration to that of a threshold element associated with the other line conductor, such that overvoltages are conducted to ground both through a circuit terminal and through a current path formed of a circuit element having a higher breakover voltage. The circuit element is provided for a line conductor, by means of which a test may be made of the subscriber interface line for current interruption even in the event of a failure of the threshold element.

In the circuit arrangement according to the invention, the protective circuit is configured such that all of the protecting components are included in overvoltage protection, so that a separate circuit is provided to differentiate between malfunction related interruptions of the subscriber line circuits and interruptions in line current resulting from malfunctions in the protective circuit itself.

The circuit arrangement according to the invention is an improvement over protective circuits in which the switch for protection test accessibility to the subscriber line circuit is not included in the protective action. This results in the advantage that the need for means of differentiating between current interruptions due to interruption of the subscriber line circuit, or an interruption due to the protective circuit, is eliminated, requiring only a test access circuitry with separate protective elements.

Two embodiments of the invention with respect to the threshold value element and to the monitoring of the assured current path are provided. The threshold value element is, in both embodiments, comprised by a low ohmic resistance inserted in the conductor of the interconnect line as well as through a thyristor diode, one side of which is connected to the side of a resistance located at the subscriber line interconnect circuit, with the other side being connected to a grounded circuit terminal. In one embodiment, the current path is formed through a voltage limiting high ohmic resistance that is connected in parallel with the low ohmic resistance of the threshold value element. In the other embodiment, the current path is formed through an equal voltage limiting and high ohmic resistance that is connected to the low ohmic resistance of the threshold value element, on the side away from the subscriber line interconnect circuit and through which access for checking the interconnect line for line interruption instead of test access via the switch for test access to the subscriber interface line, may be provided.

In accordance with a further embodiment of the invention, an additional threshold setting element is connected to the terminals of the subscriber line interconnect circuit, respectively to the subscriber line interconnect circuit side of the corresponding access switch for accessing the subscriber line interconnect circuit, which operating threshold is below the operating threshold of the remaining threshold setting elements.

The operating threshold of the true protective circuit must not be set so low that it will prevent damage to the elements in the interface circuit in every instance. This is because the alternating ringing voltage that is impressed on the subscriber line circuit may under some conditions have a high amplitude. The operating threshold of the protective circuit and correspondingly the breakdown voltage of the access switch must be high enough that under this condition, the protective circuit is not activated since there need be no concern over a malfunction of the access switches. Under this condition no requirements are imposed on the switch elements of the interface circuit, since the interface circuit is isolated from the subscriber line circuit during the ringing phase, and is therefore not affected by the ringing voltage.

The ultimate protection that is achievable through the use of additional threshold setting elements may be augmented according to a further embodiment of the invention whereby the isolation switches include electronic components which have a conducting state resistance that is suitable for current limiting.

BRIEF DESCRIPTION OF THE DRAWINGS

The invention is described with reference to the drawings, wherein.

DESCRIPTION OF THE PREFERRED EMBODIMENT

Figure 1:
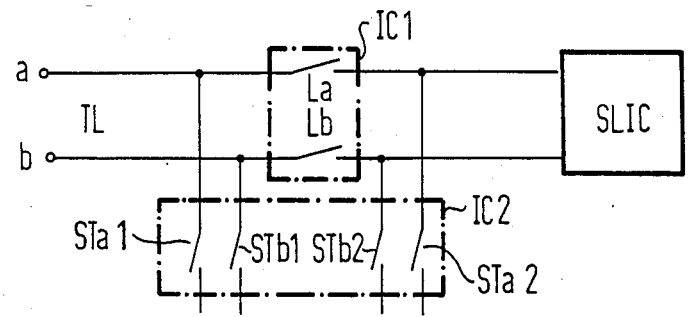
FIG. 1 is a schematic diagram of the test circuit in relation to a subscriber line circuit and the corresponding subscriber line interconnect circuit without a protective circuit.

Referring to FIG. 1, a subscriber line interconnect circuit serving the connection to a subscriber line circuit TL, with the conductors a and b, is designated by SLIC.

Test access switches STa1, STa2 and STb1, STb2, as well as isolation and/or series switches La and Lb, are provided in combination with test access to the subscriber line circuit and/or the subscriber line interconnect circuit SLIC. The conductors a and b of the subscriber line circuit TL may be isolated, separately or in common, from the connections to the subscriber line interconnect circuit SLIC with the aid of the series switches La and Lb.

The test access switches STa1 and STb1 are connected on the line side of the series switches La and Lb to the conductors a and b of the subscriber interconnect line and lead to devices, not shown, for performing the line tests. The test access switches STa2 and STb2 are connected, on the side of the series switches La and Lb facing the subscriber line interconnect circuit, to the conductors of the subscriber line interface circuit and also lead to the said test facilities.

The access switches and the series switches may be oeprated in any combination desired. When series switches La and Lb are open it is possible to test, separately, either the subscriber line circuit with the subscriber equipment connected thereto, or the subscriber line interconnect circuit via the access switches.

The said switches are electronic switches which may, for example, be MOS-transistor pairs, in which the transistors are connected in opposition in order to block currents of both polarities, but they may also be triac switches and/or combinations of triac switches and MOS-transistors.

The subscriber line interconnect circuit SLIC, shown in the form of a block diagram, includes an electronic interface circuit in which electronic circuit elements perform the functions of repeating coils and resistances similar to those provided in corresponding circuit locations in conventional subscriber line interconnect circuits.

The circuit elements of the interface circuit, as well as the electronic switches necessary in connection with testing, are endangered by external electrical influences, for example through lightning strikes or network contact, to which they may be subjected over the subscriber line circuit, and therefore require overvoltage protection with which the above described conditions are to be satisfied.

Figure 2:
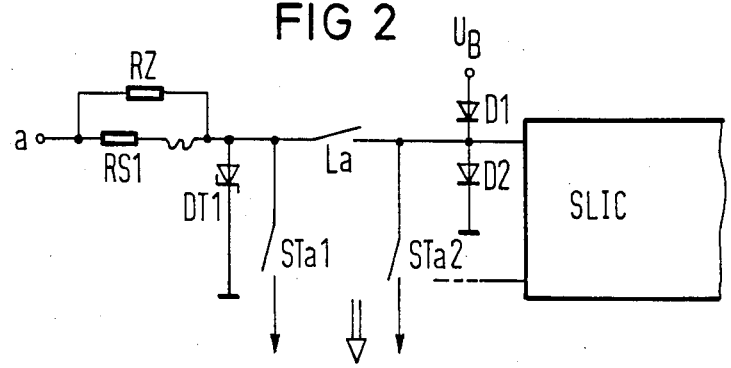
FIG. 2 is a first embodiment of the protective circuit according to the invention, which is illustrative of one line of a core pair of the subscriber line circuit and one input to the subscriber line interconnect circuit.

FIG. 2 illustrates the part of the protective circuit according to the invention related to a line conductor of the subscriber line circuit and/or that concerning a subscriber line interconnect circuit. This part of the protective circuit includes a relatively low ohmic resistance RS1 of approximately 50 ohms, which is inserted into the conductor a, of the subscriber line circuit on the side of the subscriber line circuit which includes the series switch La, as well as a thyristor diode DT1 i.e. a four region diode serving as a threshold determining switching element, that is connected between the connection of the resistance RS1 facing the subscriber line interconnect circuit SLIC, and a grounded terminal of the circuit. A thyristor whose breakover potential may be adjusted through the introduction of a specific control current corresponding to these requirements may be used in place of the thyristor diode.

A voltage stable, high ohmic resistgance RZ exhibiting 20 kOhm, for example, is connected in parallel with RS1. The test access switches Sta1 and Sta2 are similarly connected to the conductor a, of the subscriber line circuit and/or to the corresponding connection to the subscriber line interconnect circuit SLIC as shown in FIG. 1.

The protective circuit consisting of the resistance RS1 and the thyristor diode DT1 protects the series switch La, the access switches STa1, STa2 as well as the electronic interface circuit of the subscriber line interconnect circuit SLIC against overvoltages, while the thyristor diode, which normally maintains its high resistance state, goes into its low resistance state upon the appearance of such overvoltages and thereby shunts the overvoltages to ground potential.

In the event that the resistance RS1 becomes open circuited due to an overload, when RS1 is designed as a fusing resistance, it is still possible, by means of the access switch STa1 and the high ohmic resistance RZ, which, because of its relatively high breakover voltage is immune to the danger of malfunction; to determine by means of a resistance measurement, whether a current interruption on the subscriber interface line is being caused by a malfunction of the resistance RS1 or by the interruption of the conductor in the subscriber line circuit.

Depending on the type of ringing signal voltage supply, it may be necessary to set the response threshold of the protective circuit so high that the voltages reaching the electronic switches and the interface circuit may exceed their voltage breakdown. In view of these ringing signal voltages, the test switches must have a correspondingly increased voltage breakover. the electronic circuit elements of the interface circuit, however, are not endangered by the alternating ringing voltages, since during the "ringing" condition of operation the subscriber line interconnect circuit is isolated from the input supply for the alternating ringing voltage. In order that voltages with amplitudes exceeding the tolerance limits of the components in the interface circuit but still lying below the operating breakdown of the components of the protective circuit RS1/DT1 do not damage the components of the interface circuit, a further embodiment of the invention provides for the ultimate protection of the interface of the subscriber line interconnect circuit through an additional threshold setting element in the form of two diodes D1 and D2 connected between the access switc STa2 and the input of the interface circuit. The diode D1 is connected between the circuit supply voltage terminal and the input of the subscriber line interconnect circuit, and diode D2 is connected between this input and a grounded terminal of the circuit. The response threshold of this threshold setting element is correspondingly lower than that of the protective circuit described. The ultimate protection may be supplemented through the use of a circuit element functioning as the series switch La, which exhibits a suitable limiting resistance while in its conducting state.

Figure 3:
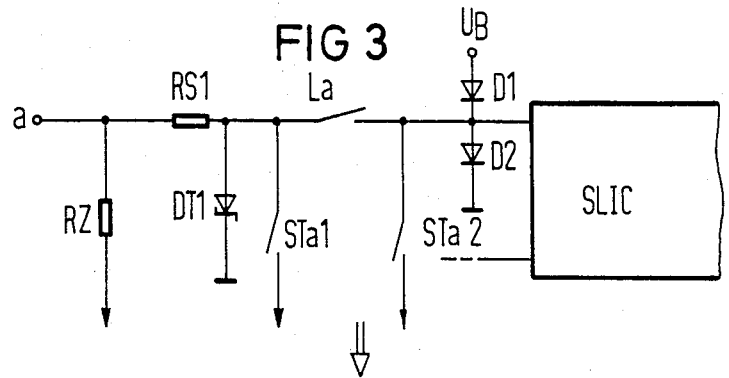
FIG. 3 is a second embodiment of the protective circuit according to the invention.

The second embodiment of the circuit arrangement according to the invention described by FIG. 3 differs from the protective circuit according to FIG. 2 in the formation of the current path, which in the event of a current interruption in the subscriber interconnect conductor, makes possible a check to determine whether the conductor cable or the resistance RS1 is open. This current path consists of a high ohmic resistance, for example 1 MOhm, which is connected to the subscriber line side of the resistance RS1 and the conductor a, of the subscriber line circuit and leads to the said test facility. In the event of such a test, test access is conducted via this resistance RZ instead of via the test access switch STa1. Because of its high ohmic value, this resistance, can in practice, be used only for this particular test.

What is claimed is:

1. A protective circuit for providing overvoltage protection of a subscriber line interconnect circuit of a digital time multiplex-communication telephone network, having an electronic interface circuit, and for providing overvoltage protection of the electronic switches associated with the subscriber line circuit for test accessibility, comprising:
    means providing each conductor of a core pair of the connected subscriber line circuit for each corresponding connection of the subscriber line interconnect circuit with isolation of the separate conductors of the core pair from the connected subscriber line circuit;
    a separate test access connection to the conductors of the core pair and to the corresponding connections of the subscriber line interconnect circuits;
    a threshold setting element connected to the line side of the said electronic switch for test access to the subscriber line circuit provided for one pair conductor of the same configuration to that of the threshold setting element of the other core pair conductor, through which overvoltages are shunted to ground and by a current path formed by a circuit element having a higher breakover voltage which is provided for each core pair conductor such that a test of the subscriber line circuit may be conducted for line interruption in the event of a current interruption in the subscriber line circuit due to damage of the threshold setting element.

2. A protective circuit according to claim 1, wherein the threshold setting element is a low ohmic resistance inserted into the line interconnect conductor and a thyristor diode connected to the subscriber line interconnect circuit (SLIC) side of the resistance and to a grounded terminal of the circuit such that the current path is formed by a voltage limiting relatively high ohmic resistance that is connected in parallel with a relatively low ohmic resistance.

3. A protective circuit according to claim 1, wherein the threshold setting element is comprised of a low ohmic resistance inserted into the conductor a, of the core pair of the subscriber line circuit and by a thyristor diode connected to the subscriber line interconnect circuit (SLIC) side of this resistance and to a ground, and wherein the current path is formed through a voltage stable high ohmic resistance connected to the side of the low ohmic resistance of the threshold setting element away from the subscriber line interconnect circuit by means of which test access for checking the subscriber line circuit for line interruption is provided.

4. A protective circuit according to claim 2, further including:
    an additional threshold setting element connected to the subscriber line interconnect circuit side of the corresponding access switch, for accessing the subscriber line interconnect circuit, whose response threshold is lower than the response threshold of the remaining threshold setting elements.

5. A protective circuit according to claim 4, wherein the isolation switch includes electronic components which have a conduction resistance while in the conducting state suitable for current limiting.

* * * * *